United States Patent
Kawakami

(10) Patent No.: US 6,721,413 B1
(45) Date of Patent: Apr. 13, 2004

(54) METHOD AND APPARATUS FOR OBSERVING AND CONTROLLING A MULTI-LAYERED COMMUNICATION NETWORK

(75) Inventor: Hiroyuki Kawakami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,358

(22) Filed: Jan. 6, 2000

(30) Foreign Application Priority Data

Jan. 6, 1999 (JP) .......................................... 11-001441

(51) Int. Cl.$^7$ ............................................... H04M 7/00
(52) U.S. Cl. ............. 379/219; 379/112.01; 379/112.06; 379/112.08; 379/133; 379/221.01
(58) Field of Search ...................... 379/112.01, 112.04, 379/112.05, 112.06, 112.1, 133, 134, 221.01, 229, 219, 112.08, 114.02, 114.06, 114.07, 114.08

(56) References Cited

U.S. PATENT DOCUMENTS

| | | | |
|---|---|---|---|
| 4,788,721 A | | 11/1988 | Krishnan et al. ............ 379/221 |
| 5,130,982 A | * | 7/1992 | Ash et al. .................... 370/352 |
| 5,355,374 A | * | 10/1994 | Hester et al. ................ 370/461 |
| 5,406,620 A | * | 4/1995 | Pei ......................... 379/221.02 |
| 5,581,610 A | * | 12/1996 | Hooshiari .................... 379/133 |
| 6,151,300 A | * | 11/2000 | Hunt et al. .................. 370/231 |
| 6,415,027 B1 | * | 7/2002 | Malik ..................... 379/221.01 |
| 6,473,402 B1 | * | 10/2002 | Moharram .................. 370/236 |
| 6,606,668 B1 | * | 8/2003 | MeLampy et al. .......... 709/241 |

FOREIGN PATENT DOCUMENTS

| | | |
|---|---|---|
| JP | 4-13343 | 1/1992 |
| JP | 06-276254 | 9/1994 |
| JP | 07-123102 | 5/1995 |
| JP | 7-95778 | 10/1995 |
| JP | 10-336197 | 12/1998 |
| WO | 89/05552 | 6/1989 |

OTHER PUBLICATIONS

"IP over WAN," Computer and Network LAN, vol. 17, No. 1, Ohm Co., Ltd pp. 36–41.
Yoichi Tobitaka [transliteration], Chokushi [transliteration], Yoshimi [transliteration], Kawahara, "A. Multimedia Traffic Management System Taking into Account User Satisfaction Levels," Information Processing Association Research Reports: Multi–media Communications and Distributed Processing, 79–3 (Nov. 14, 1996), pp. 13–18.

* cited by examiner

Primary Examiner—Bing Bui
(74) Attorney, Agent, or Firm—Foley & Lardner

(57) ABSTRACT

According to a first aspect of the present invention, there is provided a method for observing and controlling a multi-layered communication network, comprising steps of: storing control contents for each layer; observing traffic information of each link which belongs to an upper layer; storing the traffic information observed and related information for each link; altering a route in a lower layer and capacity for each link based on the observed traffic information for each link, related information for each link and the control contents for each layer.

24 Claims, 2 Drawing Sheets

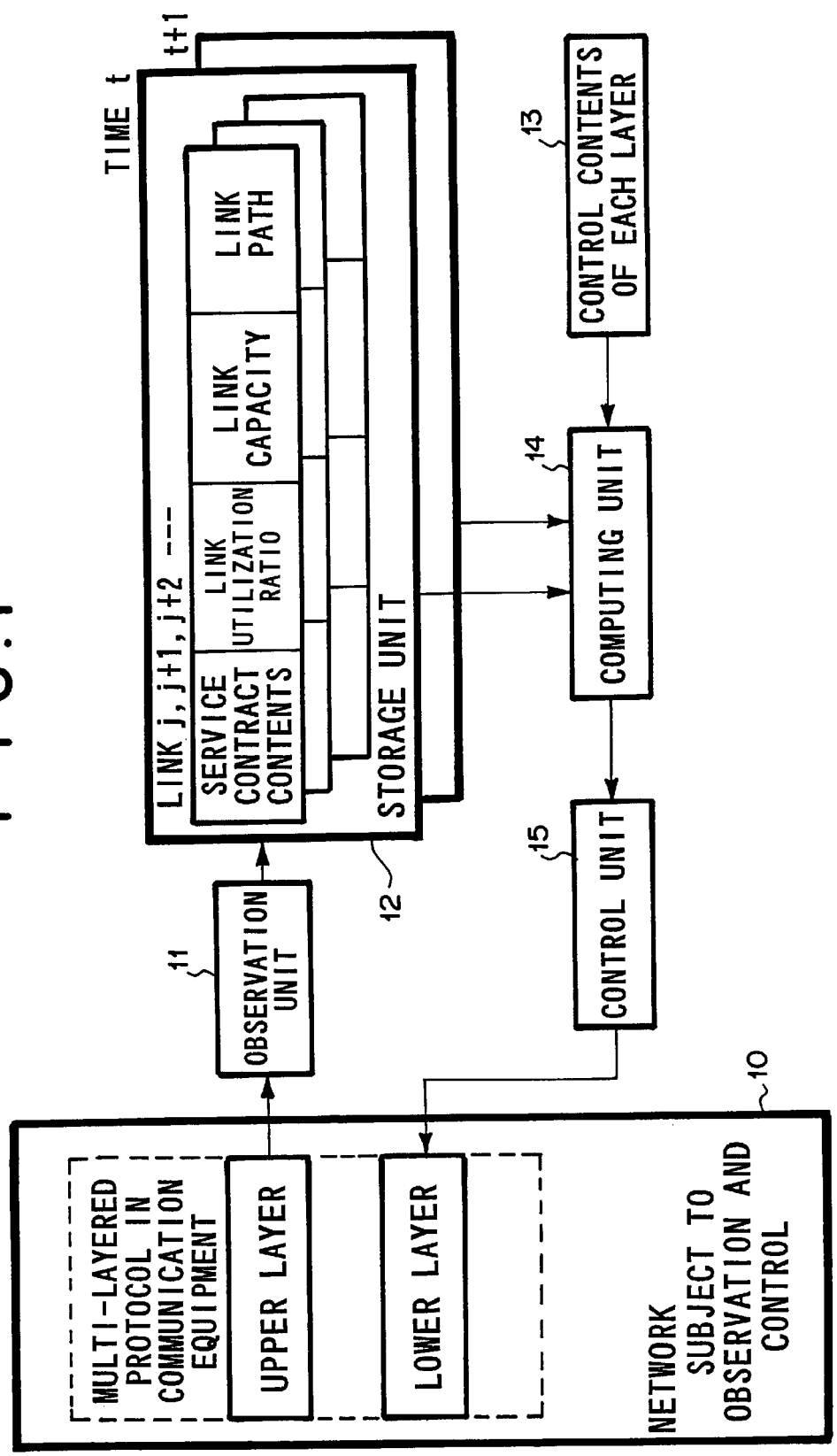

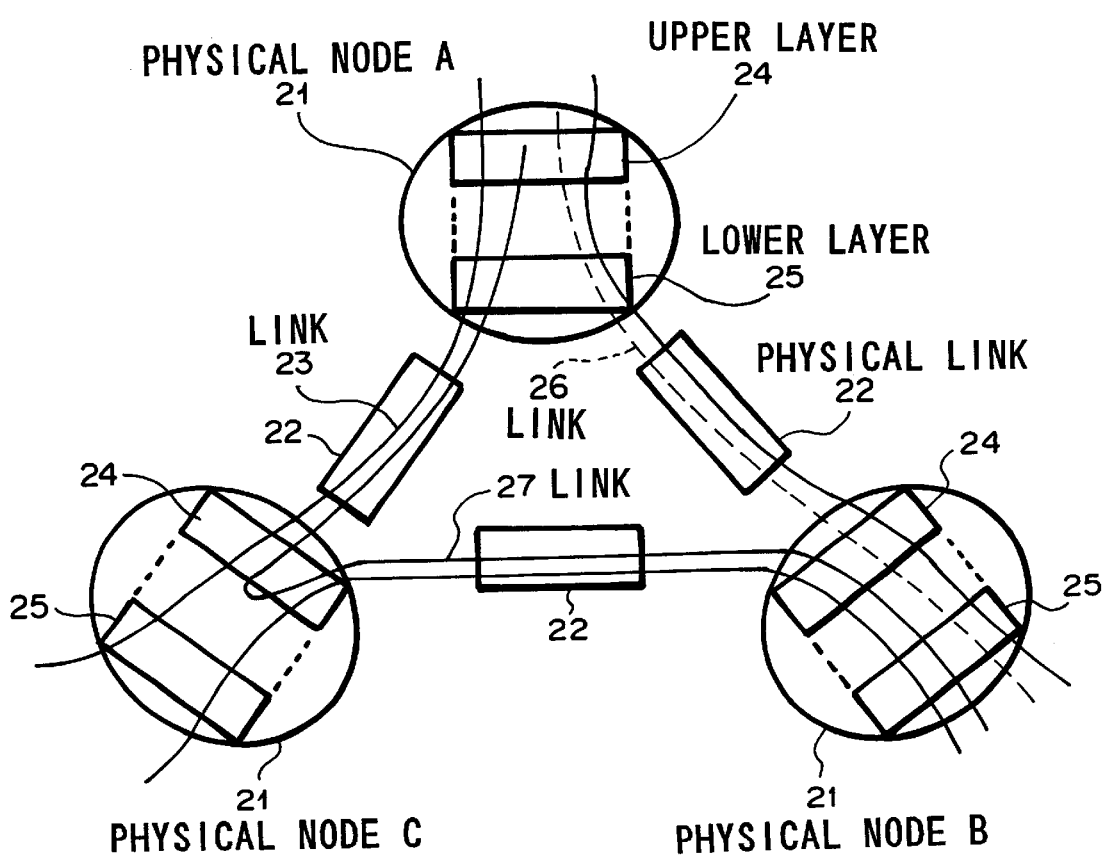

METHOD AND APPARATUS FOR OBSERVING AND CONTROLLING A MULTI-LAYERED COMMUNICATION NETWORK

BACKGROUND OF THE INVENTION

1. Field of the Invention

The present invention relates to a method and apparatus for observing traffic information of multimedia communications having various speeds including audio, image and data communications and altering a communication network configuration based on the observed results.

2. Description of the Related Art

It is difficult to forecast traffic information of multimedia communications of nowadays having various speeds including audio, image and data communications. Therefore, routinely altering a logical communication network configuration (logical link) based on data observed in a certain time intervals and service contract contents can improve a utilization ratio of a communication network.

JPA 4-13343 (a prior art reference) entitled "A link capacity control system of learning type" discloses one of such centralized communication network observation and control systems. The system of the prior art observes the amount of calls in an individual link which connects switches, and determines an allocation ratio of the capacity in each link based on an observed amount while keeping the total capacity within a capacity of the physical line which accommodates the link.

The system includes a lot of input and output signal lines and a correct answer output signal line. Also provided is a function-learning device capable of altering a relation between an input signal and an output signal corresponding to the input signal by altering a combination of values in inner registers. A function for assuming a traffic loss ratio on the basis of an observed value related to a load applied to a link and the capacity of the link is generated by learning observed values obtained from a running communication network using the function-learning device. An optimum link capacity allocation is searched and determined while estimating the link capacity allocation based on the output value of the function.

The above-mentioned conventional communication network observation and control system, however, has no concept related to multi-layered structure in observation object and control object though most of the current communication networks are multi-layered. It is difficult to anticipate a state of an upper layer from a state of a lower layer since each layer is provided with a resending control, bandwidth control and error control in consideration of the whole communication network. Therefore, it is required to observe the traffic load and real throughput at the upper layer and control the lower layer in accordance with the observed items, the service contract contents and a state of the lower layer in order to improve the utilization ratio of the network. The prior art reference, however, does not teach this point.

It is also a disadvantage that only the link capacity is regarded as an object to control. A total allocated link capacity varies in accordance with a position (physical communication network) and order for allocating a link capacity as in the case of a three-dimensional bock problem famous as a combination problem. The utilization ratio of the communication network can be improved by altering the link path of the lower layer within an allowable range in consideration of the service contract contents and the contents of the control mechanism arranged in the upper layer. The prior art reference, however, does not teach this point.

SUMMARY OF THE INVENTION

In order to overcome aforementioned disadvantages, the present invention has been made and accordingly, has an object to provide a method and apparatus for observing and controlling a communication network even when the communication network is a multi-layered communication network.

Another object of the present invention is to provide such method and apparatus which satisfies the quality of service.

A further object of the present invention is to provide such method and apparatus which improve a utilization ratio of a communication network.

According to a first aspect of the present invention, there is provided a method for observing and controlling a multi-layered communication network, comprising steps of storing control contents for each layer; observing traffic information of each link which belongs to an upper layer; storing the traffic information observed and related information for each link; altering a route in a lower layer for each link and capacity for each link based on the observed traffic information for each link, related information for each link and the control contents for each layer.

The altering step may be started when an amount in the traffic information exceeds a predetermined threshold for a predetermined period.

The altering step may use a heuristic algorithm based on a rule of thumb.

According to a second aspect of the present invention, there is provided an apparatus for observing and controlling a multi-layered communication network, comprising: means for storing control contents for each layer; means for observing traffic information of each link which belongs to an upper layer; means for storing the traffic information observed and related information for each link; means for altering a route in a lower layer for each link and capacity for each link based on the observed traffic information for each link, related information for each link and the control contents for each layer.

The altering means may be activated when an amount in the traffic information exceeds a predetermined threshold for a predetermined period.

The altering means may use a heuristic algorithm based on a rule of thumb.

The traffic information may include at least one of a link utilization ratio, a delay time and an abolition rate.

The traffic information may include a throughput of packets.

The related information may include service contract contents, a current link capacity, and a current link route.

The service contract contents may include contracted quality of service, a contracted link capacity and a priority for ensuring a link capacity.

The control contents for each layer may include a presence/absence of a resending control, a latency to resending, and a confirmation/non-confirmation type.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 1 is a diagram showing a multi-layered communication network and an apparatus for observing and controlling the multi-layered communication network; and FIG. 2 is a diagram exemplifying an inner structure of communication network 10.

DETAILED DESCRIPTION OF THE PREFERRED EMBODIMENTS

Embodiments of the present invention will be described next with reference to the drawings.

In this embodiment, a multi-layered communication network comprises a TCP (Transmission Control Protocol) layer as an upper layer, an ATM (Asynchronous Transfer Mode) layer as a lower layer, and an IP (Internet Protocol) layer as the intermediate layer between the upper layer and the lower layer.

Referring to FIG. 1, communication apparatuses or nodes constitute communication network 10 which is an object of an observation. Observing unit 11 observes traffic information in the unit of a link from the upper layer in a communication apparatus which terminates both of the upper and lower layers periodically. The observed traffic information includes at least one of a link utilization ratio (bandwidth utilization ratio), a delay time and an abolition rate in the upper layer, for example.

Storage unit 12 stores the observed values within a prescribed period. This enables a communication network control in consideration of past-observed values. A length of the period is, therefore, determined from a demand generation pattern and capacity restriction for a storage region in storage unit 12.

Not only the observed traffic information but also related information to each link, for example, service contract contents of the link, the current link capacity and the current link path are stored in storage unit 12 on a link basis. The service contract contents includes a contracted quality of service (an error rate, traffic loss rate), contracted link capacity (bandwidth) and priority for ensuring the link capacity.

Control contents 13 of each layer includes a control mechanism information at each layer, such as the presence/absence of a resending control, a latency to resending, a confirmation/non-confirmation type.

Computing unit 14 determines a link capacity and link path based on information from storage unit 12 and information from control contents 13, while considering whether or not controlling the lower layer satisfies the service contract contents. This is a combination problem. Therefore, in case of a large-scale communication network, it is difficult to control in real time if a method based on simulation is adopted. Therefore, a new communication network is determined using a method of determining a network configuration by learning information within a certain time period or using a fast heuristic algorithm based on a rule of thumb.

Control unit 15 sets the determined configuration information of the lower layer on multi-communication equipment (nodes) in order to reflect them to practical communication network 10.

FIG. 2 is a diagram exemplifying an inner structure of communication network 10 objective for observation and control in FIG. 1 along with links among nodes.

Communication network 10 objective for observation and control comprises three physical nodes A, B and C (represented by the reference numerals 21) such as ATM, and physical links 22 such as optical fibers containing links 23 which mean logical connections.

Physical node 21 includes multi-protocol layers consisting of upper layer 24 (of TCP in this case) and lower layer 25 (of ATM in this case). Link 23 is terminated at each layer. Control mechanisms allocated to each layer, such as a window control and resending control work.

Upper layer 24 and lower layer 25 are generally combined in a relation of N:1 but this may be 1:1. When accommodated in lower layer 25, each packet in upper layer 24 are divided, and overhead information of lower layer 25 is added to the divided packets.

Data transmissions in the upper layer 24 and lower layer 25 will be described in more detail. TCP packet of 65 kilobytes at the maximum, which is transmitted to and received from each port at the application, is fragmented at IP packet level and accommodated into ATM payload of 47 bytes. TCP is a protocol of confirmation type for transmitting data in a designated window size, including the resending control.

In such the multi-protocol configuration, direct observation of a throughput (the number of transferred TCP packets in unit time) at upper layer 24 is important to know a state of a service that is provided to a user.

When an error rate or delay time increases at lower layer 25 or an ATM layer due to, for example, deterioration in a radio transmission, lower layer 25 transmits cells to a certain degree, whereas upper layer 24 seldom transmits a packet. Therefore, the throughput at upper layer 24 may be lowered extremely as compared with lower layer 25. In this case, even when observing the throughput at lower layer 25, it is difficult to know a throughput at upper layer 24 that provides services closer to the user. It is accordingly important to observe the state of upper layer 24.

In practical observations, information is collected routinely on a link basis from the communication network through observation unit 11, and stored in storage unit 12. When at least one of amounts such as a link utilization ratio, a delay time, and an abolition ratio in the traffic information exceeds a respective predetermined threshold over a certain time period, computing unit 14 is activated. Computing unit 14 controls lower layer 25 in order to cope with variations at upper layer 24.

Controls of lower layer 25 will be described next.

Link 23 represents a logical link in TCP layer. Link 23 is accommodated in a link of ATM level and is integrated in physical link 22 such as an optical fiber in a relation of N:1.

The link of ATM level may be of SVC (Switched Virtual Connection) system that dynamically establishes a connection when the user demands it. PVC (Permanent Virtual Connection) system is currently rather popular. In the PVC system, a connection having a certain bandwidth and path information is statically established by a communication service provider based on a service contract through the operation system in a communication network. A general line communication/switch, for example, cross connect, SDH (Synchronous Digital Hierarchy) and WDM (Wavelength Division Multiplex) is a system for setting lines statically and integrally from the center based on bandwidths and path information. Accordingly, control from the center, assuming PVC of ATM, can be widely applied to other line communications/switches.

A contract contents of lower layer 25 varies in accordance with communication service providers. The contract contents include a contracted quality of service (an error rate, traffic loss rate), contracted link capacity (bandwidth) and priority for ensuring the link capacity as mentioned above. If focusing only on the traffic loss rate and bandwidth, control by control section 14 can be realized, for example, by applying the prior art.

The utilization ratio can also be improved by altering a bandwidth allocation with the heuristic algorithm based on a rule of thumb. If the utilized bandwidth by a certain user is narrower than a predetermined value over a certain time period and the service contract contents with the user include that "the bandwidth may be decreased temporarily", for example, the heuristic algorithm is employed to decrease the bandwidth for the user by a certain ratio and allocate it to another user. Another method can be employed, in which the information of the service contract contents includes that "the bandwidth can be decreased temporarily" with a certain priority.

Improving the utilization ratio of the communication network is restricted by a limitation if the method of altering only link capacity is adopted. For example, it will be explained a case where a demand for a broader bandwidth occurs to link 26 (represented by a dotted line) in use. It is assumed that link 26 can not be established since an available bandwidth of physical link 22 for connecting the node A with the node B is short.

The computing unit 14 firstly searches another available path in the communication network. This method of searching includes the heuristic algorithm based on a rule of thumb as a simple example.

Next, for example, the path having the shortest path length among the paths which satisfy restriction values contained in the service contract contents (such as an error rate, delay, guaranteed bandwidth, and the presence of a sending control mechanism in the upper layer) is selected as a path to which the present path switches. This path altering control is not limited only to the link of which capacity increases. Other link paths of which capacities maintain constant or decrease may also be altered in order to allocate capacities thereof to other links efficiently. In FIG. 2, link 26 represents an expected additional link that has not established because there is no remainder in physical link 22, and link 27 represents another additional link that has established by path alteration.

When altering a path for a link to another, a short transmission interrupt occurs. However, if the upper layer has a function of resending, the communication in the link cope with the interrupt. Therefore, if computing unit 14 fetches the information that the upper layer has a function of resending, the computing unit 14 may alter the path for a link to another.

The present invention also considers the alteration of the link configuration at the lower layer in consideration of the control mechanism at each layer of the multi-protocol layers. Therefore, even when a hit occurs at the lower layer, the contracted service quality can be provided by the resending control at the upper layer. Accordingly the present invention has a second effect capable of altering the configuration at the lower layer.

The present invention is not limited to the communication network configuration consisting of TCP, IP and ATM as described in the embodiments but rather can be applied generally to multi-protocol layered communication networks such as a network including IP and WDM (Wavelength Division multiplex).

The term "link" employed in the present invention is not always limited to mean a connection of 11. If a plurality of connections demanding the same contract services are present between two nodes in a large-scale communication network, for example, the term also includes a case to process the connections integrally for the purpose of reducing amounts of information transmission between the apparatus for observation and control and the nodes, and of reducing processes at the apparatus for observation and control. In this case, summarized information (such as the worst value and an average value) from a node is transferred on an integrated basis to the apparatus for observation and control, which in turn controls on the integrated basis.

The present invention observes the state of the upper layer and accordingly has a first effect capable of reflecting information closer to the user actually accepting services to the communication network.

Only altering the link capacity according to the prior art has a limitation to improve the utilization ratio of the communication network due to the link-establishing order and a combination of traffic flowing into the communication network. To the contrary, the present invention allows the lower layer to alter a path for a link and accordingly has a second effect capable of improving the utilization ratio of the communication network independent of the link-establishing order and the combination of the traffic.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A method for observing and controlling a multi-layered communication network, comprising steps of:

storing control contents for each layer;

observing traffic information of each link which belongs to an upper layer;

storing the traffic information observed and related information for each link; and altering a route in a lower layer and a capacity for each link based on the observed traffic information for each link, the related information for each link and the control contents for each layer.

2. The method according to claim 1, wherein said traffic information includes at least one of a link utilization ratio, a delay time and an abolition rate.

3. The method according to claim 1, wherein said traffic information includes a throughput of packets.

4. The method according to claim 1, wherein said related information includes service contract contents, a current link capacity, and a current link route.

5. The method according to claim 4, wherein said service contract contents include contracted quality of service, a contracted link capacity and a priority for ensuring a link capacity.

6. The method according to claim 1, wherein said control contents for each layer include a presence/absence of a resending control, a latency to resending, and a confirmation/non-confirmation type.

7. The method according to claim 1, wherein the altering step is started when an amount in said traffic information exceeds a predetermined threshold for a predetermined period.

8. The method according to claim 1, wherein the altering step uses a heuristic algorithm based on a rule of thumb.

9. An apparatus for observing and controlling a multi-layered communication network, comprising:

means for storing control contents for each layer;

means for observing traffic information of each link which belongs to an upper layer;

means for storing the traffic information observed and related information for each link; and means for altering a route in a lower layer and a capacity for each link based on the observed traffic information for each link, the related information for each link and the control contents for each layer.

10. The apparatus according to claim 9, wherein said traffic information includes at least one of a link utilization ratio, a delay time and an abolition rate.

11. The apparatus according to claim 9, wherein said traffic information includes a throughput of packets.

12. The apparatus according to claim 9, wherein said related information includes service contract contents, a current link capacity, and a current link route.

13. The apparatus according to claim 12, wherein said service contract contents include contracted quality of service, a contracted link capacity and a priority for ensuring a link capacity.

14. The apparatus according to claim 9, wherein said control contents for each layer include a presence/absence of a resending control, a latency to resending, and a confirmation/non-confirmation type.

15. The apparatus according to claim 9, wherein the altering means is activated when an amount in said traffic information exceeds a predetermined threshold for a predetermined period.

16. The method according to claim 9, wherein the altering means uses a heuristic algorithm based on a rule of thumb.

17. An apparatus for observing and controlling a multi-layered communication network, comprising:

a storage unit for storing control contents for each layer;

an observation unit for observing traffic information of each link which belongs to an upper layer;

a storage unit for storing the traffic information observed and related information for each link; and a controller for altering a route in a lower layer and a capacity for each link based on the observed traffic information for each link, the related information for each link and the control contents for each layer.

18. The apparatus according to claim 17, wherein said traffic information includes at least one of a link utilization ratio, a delay time and an abolition rate.

19. The apparatus according to claim 17, wherein said traffic information includes a throughput of packets.

20. The apparatus according to claim 17, wherein said related information includes service contract contents, a current link capacity, and a current link route.

21. The apparatus according to claim 20, wherein said service contract contents include contracted quality of service, a contracted link capacity and a priority for ensuring a link capacity.

22. The apparatus according to claim 17, wherein said control contents for each layer include a presence/absence of a resending control, a latency to resending, and a confirmation/non-confirmation type.

23. The apparatus according to claim 17, wherein the altering means is activated when an amount in said traffic information exceeds a predetermined threshold for a predetermined period.

24. The method according to claim 17, wherein the altering means uses a heuristic algorithm.

* * * * *